United States Patent [19]

Wildey

[11] 4,064,956
[45] Dec. 27, 1977

[54] VEHICLE DRIVE AND SUSPENSION SYSTEM

[75] Inventor: Allan J. Wildey, Lakeside, Canada

[73] Assignee: Eaton Yale Ltd., London, Canada

[21] Appl. No.: 646,223

[22] Filed: Jan. 2, 1976

[51] Int. Cl.² .......................................... B62D 61/10
[52] U.S. Cl. ................................ 180/24.05; 180/70 R
[58] Field of Search ............. 180/24.05, 24.06, 24.02, 180/24.11, 24.13, 70 R

[56] References Cited

U.S. PATENT DOCUMENTS

| 1,707,535 | 4/1929 | North | 180/24.05 |
| 1,885,508 | 11/1932 | Brozincevic | 180/24.13 X |
| 1,975,794 | 10/1934 | Knox | 180/24.05 |
| 2,098,894 | 11/1937 | Van Doorne | 180/24.05 |
| 2,165,723 | 7/1939 | North | 180/24.05 |
| 2,215,506 | 9/1940 | Hollmann | 180/24.05 |
| 2,492,126 | 12/1949 | Collender | 180/24.11 X |

Primary Examiner—Joseph F. Peters, Jr.
Assistant Examiner—John P. Silverstrim
Attorney, Agent, or Firm—Teagno & Toddy

[57] ABSTRACT

A bogie drive and suspension system for a rough terrain vehicle. Suspension is by a pair of walking beams, each of which is supported by trunnions which are integral and coaxial with a central right angle drive transfer unit. Right angle drive transfer units at the ends of the walking beam transfer power to wheel end reduction units. The transfer units are of modular construction including pre-assembled and pre-aligned right angle bevel gear sets. Flexible gear type couplings, connecting the central transfer unit with the wheel end transfer units, permit deflection of the walking beams under load without affecting gear alignment.

9 Claims, 4 Drawing Figures

VEHICLE DRIVE AND SUSPENSION SYSTEM

This invention relates to heavy duty rough terrain vehicles, and more particularly to a bogie drive and suspension arrangement for such vehicles.

Bogie drive and suspension systems are commonly used on rough terrain vehicles in order to provide maximum traction and stability. In its simplest form a bogie arrangement comprises a pair of so-called walking beams center-pivoted on either side of the vehicle frame, and some form of power transmission system to transfer power from a differential unit centrally located between the side frame members of the vehicle to drive wheels mounted at the ends of the walking beams. In order to accommodate the rocking movement of the walking beam, a transfer case is generally provided at the center of the walking beam with its input shaft coincident with the pivot axis of the beam. Power is then transferred through a right angle drive arrangement from the central transfer case to the drive wheels mounted for rotation at the opposed ends of the beam.

Power can be transferred from the differential to the central transfer case by means of a solid axle or through a jointed drive shaft, depending on the relative locations of the differential and walking beam pivot. In the prior art there are several means for transferring power from the central transfer case to the wheel ends.

According to one prior art system, as illustrated by U.S. Pat. No. 2,319,978, power is transferred by means of a chain and sprocket arrangement. According to another prior art system, power is transferred by means of trains of spur gears mounted either externally of the walking beam, or enclosed by a hollow beam structure.

Both of the above prior art systems have serious drawbacks. In a chain drive system, it is difficult to enclose the chains, and an open chain system is subject to fouling and breakage of the chains. This is especially true where the vehicle is intended to operate in a forestry environment where tree branches, stumps, and the like are likely to come into contact with the chain.

In a gear driven system it is difficult, without making the system unduly heavy, to produce a system in which deflection of the beam due to the high loads encountered on rough terrain does not cause serious gear alignment problems.

Another deficiency of prior art systems has been in the area of serviceability. In prior art designs the entire walking beam, including the central transfer case, and wheel end transfer means, has been in the form of an integral unit. Thus, failure of a single component is likely to require extensive disassembly of the walking beam structure and the related drive components in order to effect replacement or repair. In remote areas where such equipment is used, the facilities and spare parts to effect such repairs are generally not available, resulting in excessive downtime and low availability of the machine.

Considering the above problems, it is an object of this invention to provide a bogie drive and suspension system in which the drive components are relatively free from fouling and damage under rough terrain conditions.

Another object of the invention is to provide a bogie system incorporating a walking beam suspension in which deflection of the walking beam does not adversely affect the alignment of the drive train components.

Another object of the invention is to provide a bogie system incorporating easily field-replaceable component parts.

To meet the above objectives, the present invention provides a bogie drive of modular construction including a plurality of transfer gear modules interconnected by flexibly jointed drive shafts.

More specifically, at each point in the drive system where a change in direction of the drive line occurs, the transfer is effected through a modular transfer case, which is bolted to the walking beam structure as a complete unit. Connection between the modular units is by drive shafts incorporating flexible couplings to accommodate a certain degree of misalignment. The couplings are of an enclosed design to avoid fouling, and additional cover members are provided, at least partially enclosing the couplings, to further protect the system. In the event of failure of one of the transfer modules, that module can be easily replaced in the field merely by disconnecting the coupling(s) on the related drive shaft(s) and unbolting the affected module. Alignment between modules is not critical due to the use of the coupled connecting shafts, and substantial deflection of the walking beam structure can be tolerated without adversely affecting the drive train. Accordingly, the strength and stiffness characteristics of the walking beam can be designed solely for the loading of the vehicle, rather than for gear alignment, resulting in a highly efficient design. The assembly of the various modules forms a self-contained drive unit which is readily adaptable to vehicles having different wheelbases.

Since the critically aligned gear components are all self-contained within each module, they can be factory aligned, and not affected by field replacement.

The bogie drive system of the invention also makes maximum use of interchangeable parts for ease in field storage, as well as economy.

IN THE DRAWINGS

Figure 1:
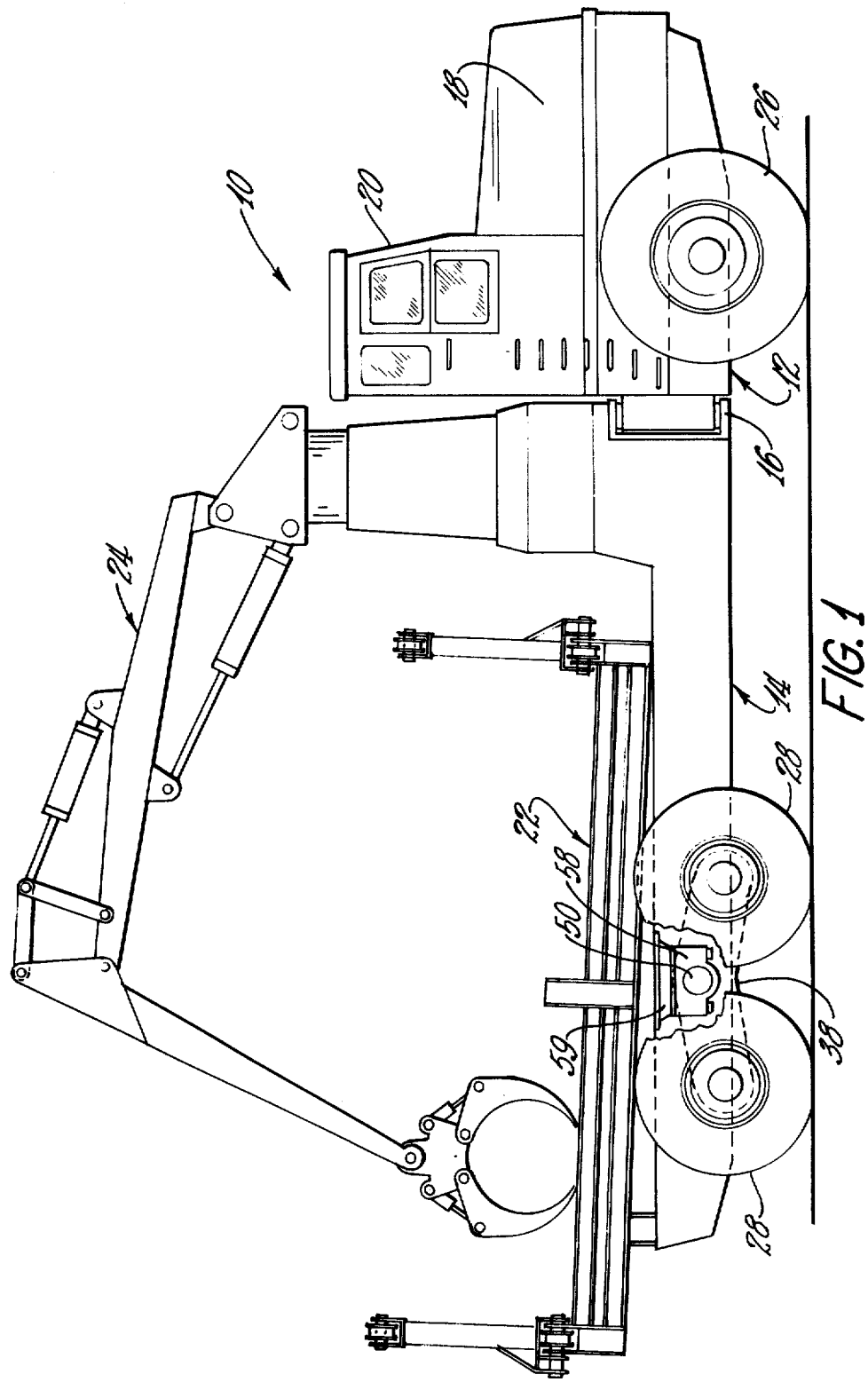
FIG. 1 is a side elevation view of a log forwarder incorporating the invention.

Referring to FIG. 1, there is illustrated a timber forwarder, designated generally by the numeral 10, which is used to transport logs from a preliminary processing site, over rough terrain, to a remote collecting point for further processing, or for further transport over improved roads by truck or other conventional means.

The forwarder illustrated herein is an articulated vehicle including a front frame 12 and a rear frame 14, pivotally connected at 16 in a well-known manner. The front frame carries an engine 18, a cab 20, and essentially all the controls required for operating the vehicle, while the rear frame carries a large bunk structure 22 for receiving logs, and a knuckle boom loader 24, which can be controlled from the cab 20.

Power is transmitted from the engine 18, by means of a conventional transmission and transfer system (not shown) to the front wheels 26 and to the rear wheels 28. The front wheel suspension and drive is conventional and will not be discussed further.

Figure 2:
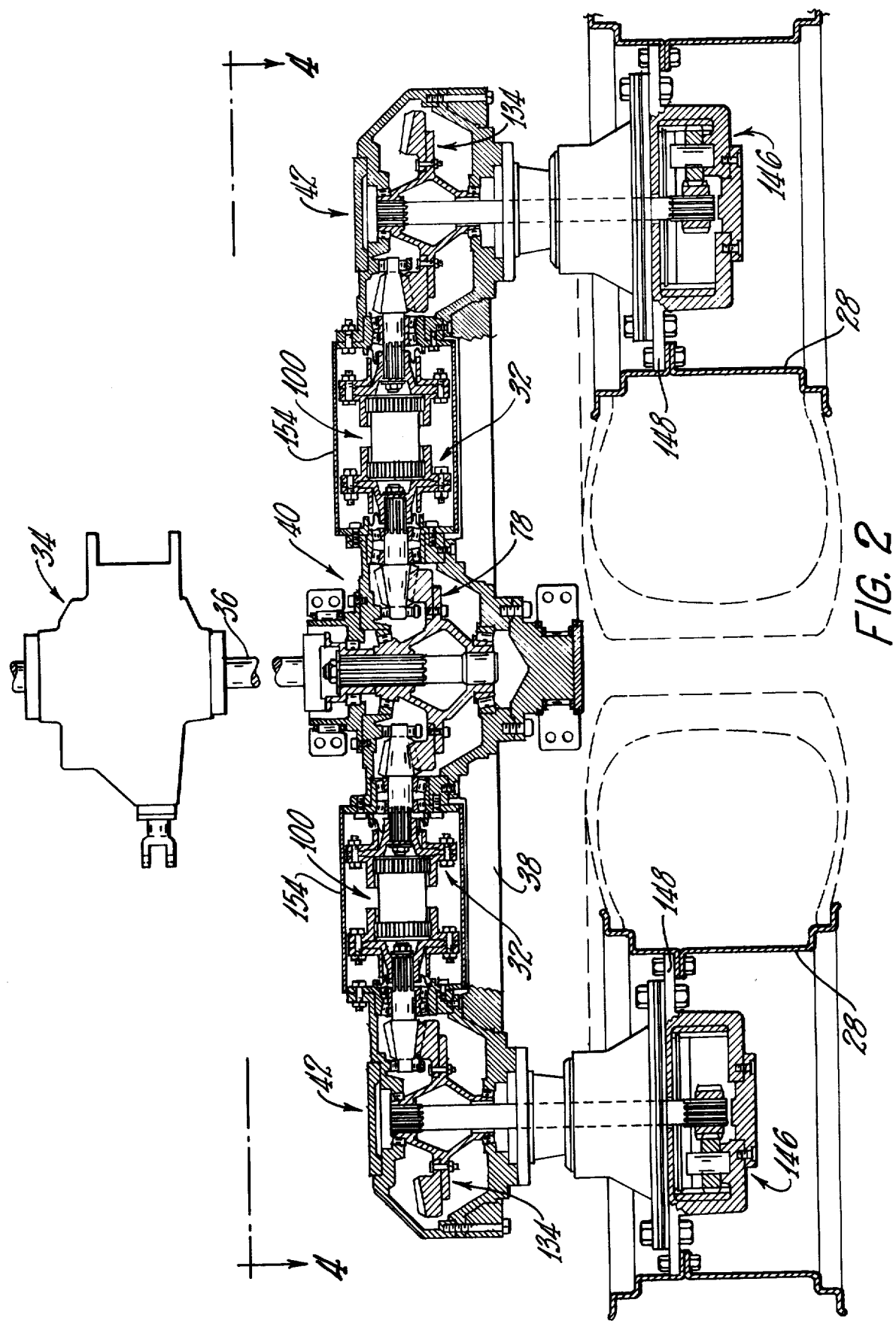
FIG. 2 is a plan view of the bogie drive of FIG. 1, with some parts shown in section.

Referring to FIG. 2, power is transmitted to the rear wheels by means of a bogie drive and suspension system 32. Since the system is identical on both sides of the vehicle, only the near half shown in FIG. 1 will be discussed in detail.

Power is transferred from a transfer case (not shown) to a centrally mounted differential unit 34 by means of a conventional drive shaft (not shown). In the illustrative embodiment the differential 34 is mounted directly to the frame 14 and the power is transmitted from the differential to the bogie via a half shaft 36. The half shaft 36 can be a solid shaft; however, the shaft 36 preferably includes a flexible coupling or universal joint to accommodate deflection of the frame structure which can affect the alignment between the differential output and the bogie input.

The bogie system 32 comprises a walking beam 38 pivotally mounted on the frame 14, a modular central transfer unit 40, and modular wheel end transfer units 42 mounted at opposite ends of the walking beam.

The walking beam 38 is a rigid one-piece member of shallow inverted V-shape, which serves to support the rear wheels 28 for oscillation about a central pivot axis 44. It is important to note that in accordance with the invention, the walking beam serves only as a suspension member, deflection of the beam having no effect on the alignment of the geared drive system, as will be described in more detail. Thus, the walking beam can be designed to serve this single purpose without having to add stiffness, which is not necessarily desirable to the load carrying function, to maintain gear alignment.

In accordance with the invention, the central transfer unit 40 serves as the supporting member for the walking beam 38. Referring to FIG. 2, the housing 46 of the central transfer unit 40 is closely received in a central aperture formed through the walking beam 38, and bolted to the walking beam at surface 48 by a plurality of bolts (not shown) arranged in a circular pattern.

Figure 3:
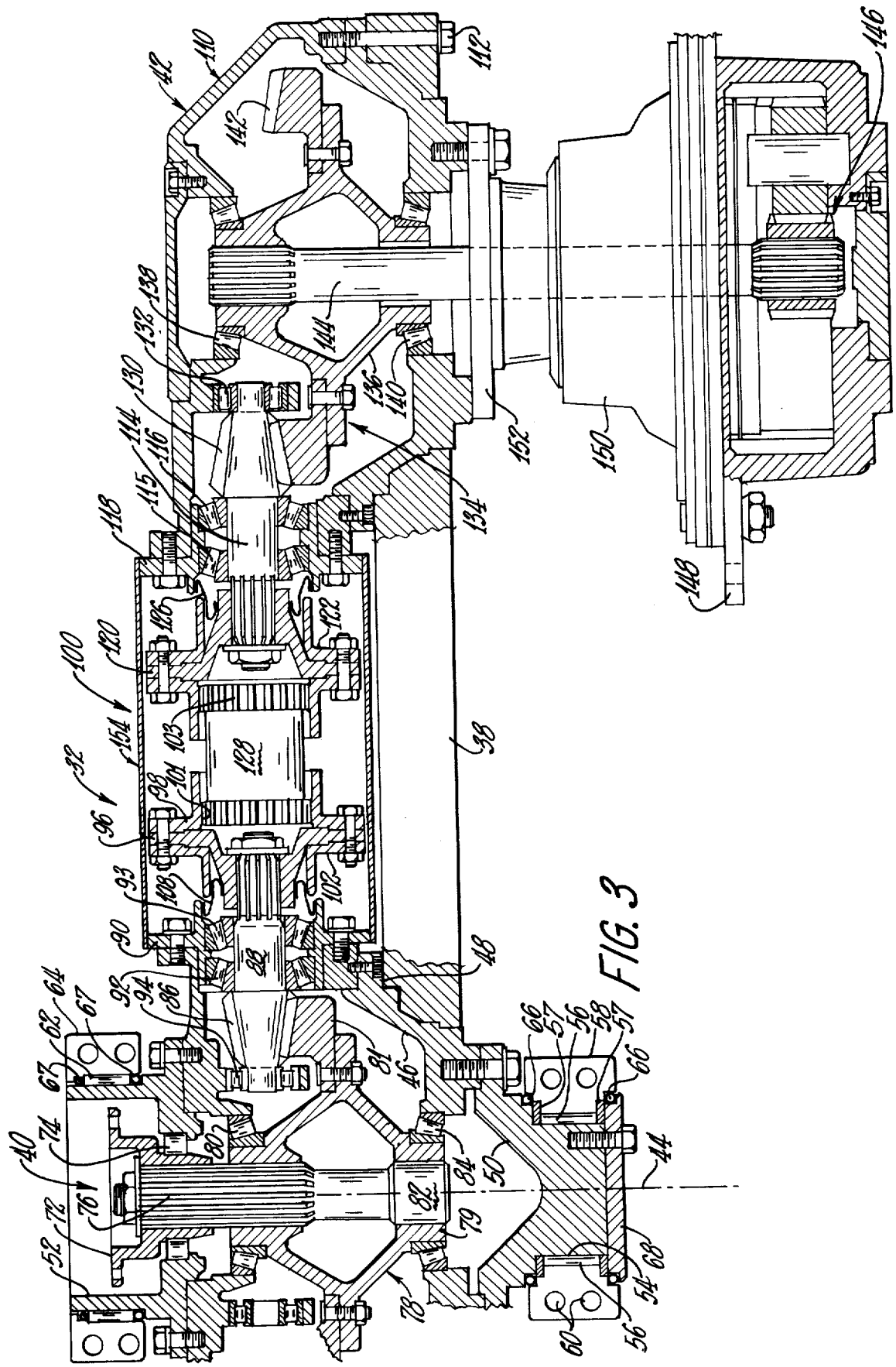
FIG. 3 is an enlarged view of a portion of the bogie drive shown in FIG. 2.

A first trunnion 50 is bolted to the housing 46 on the outside, or wheel side, of the walking beam 38, and a second trunnion 52 is bolted to the housing 46 on the inside of the walking beam 38. The outer or first trunnion 50 includes a cylindrical bearing surface 54 which receives a bearing 56 and thrust washers 57. A bearing cap member 58 surrounds and retains the trunnion bearing and thrust washers, and includes a plurality of holes 60, for bolting to an intermediate member 59, which is rigidly attached to the rear frame 14 of the vehicle. O-ring seals 66 are retained by the cap member 58 to protect the bearing, and a cover plate 68 is bolted over the end of the trunnion 50. The location of the walking beam transversely relative to the vehicle is thus fixed by the interrelationship of the trunnion 50, the bearing 56, the thrust washers 57, the cap 58, and the cover 68, as best illustrated in FIG. 3.

The inner or second trunnion 52 is similar to the outer, except that the trunnion is annular to provide an open end to accommodate a coupling flange 72 for connection to the half shaft 36. A cap member 64, similar to cap 58, retains a trunnion bearing 62 and O-ring seals 67, and is also bolted to intermediate member 59. The trunnion 52 floats relative to the bearing 62 in the transverse direction, the transverse locating function being performed solely by the outer trunnion 50.

The input to the bogie drive system 32 is through a coupling flange 72, which can be attached to the half shaft 36 by any convenient, conventional means (not shown), e.g., direct connection through a mating flange, or through a flexible coupling or universal joint. The flange 72 is supported in the trunnion 52 by bearings 74 and is splined to an input shaft 76. Also splined to shaft 76 is an input gear assembly 78, comprising a hub 79 and a bevel ring gear 81 bolted to the hub. One end of the hub is splined to the input shaft and supported by a bearing 80 and its opposite end is piloted to an enlarged section 82 of input shaft 76, and supported in the housing 46 by a bearing 84.

The bevel ring gear 81 meshes with output bevel gears 86 formed on opposed output shafts 88 at right angles to the input shaft 76. Each of the shafts 88 is positioned in the housing 46 by an end cap member 90 bolted to the housing. Bearings 92, 93 support the center section of shaft 88 within the cap 90, and a bearing 94 supports the gear end of shaft 88 in the housing 46. A coupling flange 96 is splined to the output end of shaft 88.

Since the wheel end transfer units 42 are identical, only one will be described in detail.

The coupling flange 96 is bolted to a flange portion 98 of a flexible coupling assembly 100, which will be described in more detail below. A sealing flange 102 is also bolted to coupling flange 96, and includes an annular lip which fits closely adjacent a lip formed on the cap member 90. A flexible sealing member 108 closes the gap between the two lips to effectively seal the output end of the central transfer unit 40.

Each of the wheel end transfer units 42 comprises a circular housing 110 received in an aperture formed adjacent the end of the walking beam 38, and attached to the walking beam by a circular pattern of bolts 112.

The input to the transfer unit 42 is similar to the output of the central transfer unit, comprising a splined input shaft 114 supported by bearings 115, 116 received in an end cap 118. The input shaft 114 further includes a bevel gear 130, and the gear end of the shaft is supported by a bearing 132 received in the housing 110. A coupling flange 120 is splined to the input side of the shaft 114 and mates with the opposite end of the flexible coupling assembly 100.

The coupling 100 comprises a pair of back-to-back flange members 98 connected by a midshaft 128. The flange members have internal teeth 101 formed thereon, which mesh with external teeth 103 formed on the midshaft 128. The ratio of pitch diameter face width of the gear teeth is selected, and the teeth are cut in a manner which permits some rocking movement of the shaft 128 within the flanges 98 to accommodate misalignment of the central and wheel end transfer units due to deflection of the walking beam under load.

The input end of the housing 110 is sealed in the same manner as the output end of the central transfer unit, with adjacent annular lips formed on the end cap 118 and on a sealing flange 122, joined by a flexible sealing member 126.

In the wheel end transfer unit 42 another right angle transfer occurs to transmit power to the wheel 28 by means of a bevel gear assembly 134. The bevel gear assembly 134 comprises a hub 136 supported by bearings 138 and 140 received in the housing 110, and a ring gear 142 bolted to the hub. An elongated drive shaft 144 is splined to one end of the hub 136 and extends outward of the housing 110 to drive a conventional wheel and reduction unit 146. The details of the wheel mounting and reduction unit form no part of the present invention and will not be described in detail herein. The wheel 28 is bolted to a hub 148, which carries the wheel reduction unit, and which in turn is bolted to a hub carrier 150. The hub carrier 150 includes a flange 152 which is bolted to the output side of the housing 110, which extends through the walking beam 38.

Figure 4:
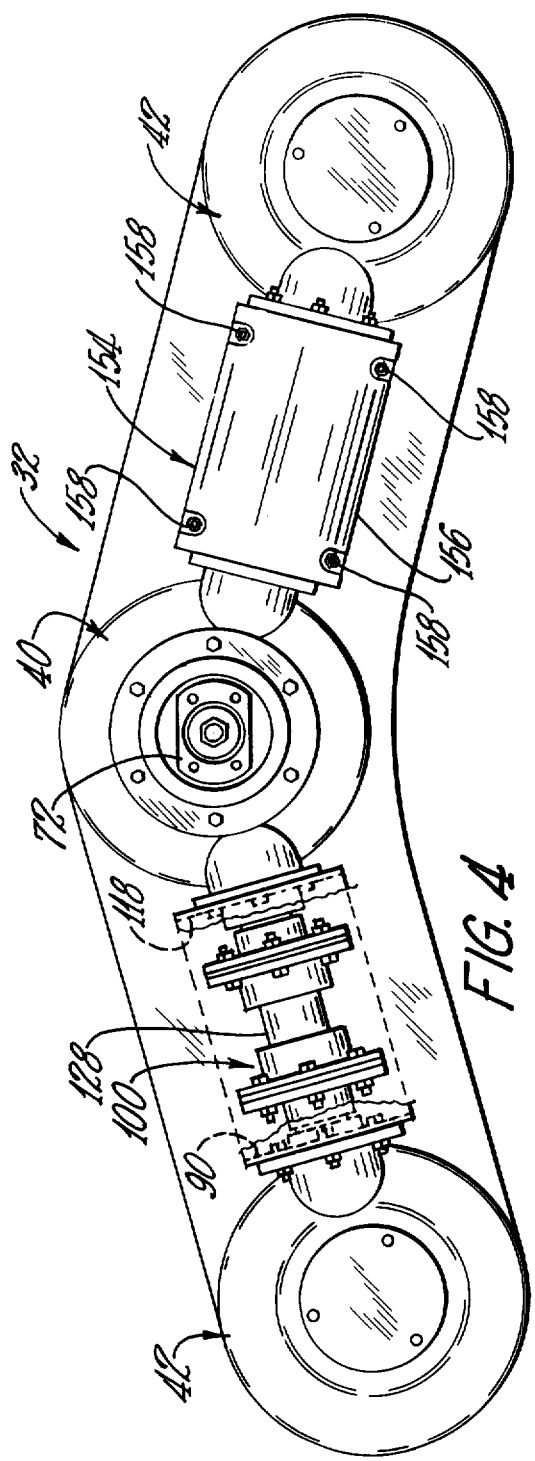
FIG. 4 is an elevation view of the invention taken along line 4—4 of FIG. 2.

The enclosed design of the coupling assembly 100 contributes to making the present system less susceptible to fouling than prior art designs; however, to further protect the system cover assemblies 154 are provided (FIG. 4) to enclose all the rotating members between the central transfer unit and each of the wheel end transfer units. The cover assembly 154 comprises a pair of essentially identical semi-cylindrical members, only one of which, 156, is shown, which engage the peripheral surfaces of the flange portions of end caps 90 and 118 of the central transfer unit 40 and the wheel end transfer unit 42, respectively. The cover members are clamped to the flanges by means of a plurality of bolts 158 received in bosses welded or otherwise formed on the cover members. The result is a cylindrical cover which essentially completely encloses the otherwise exposed moving parts of the bogie assembly which would be subject to fouling. Expected deflection of the walking beam under load will not adversely affect the cover member.

As discussed generally above, the modular construction of the individual transfer units of the present invention greatly simplifies field repair and replacement. If a failure occurs in one of the wheel end transfer units 42, the unit can be removed from the system simply by taking apart the coupling 100 at the coupling flange 120, and unbolting the hub carrier 150, and removing the bolts 112 attaching the housing 110 to the walking beam 38. A new or rebuilt unit 42 can then be installed in its place just as simply. Since the transfer unit 42 is a self-contained module, the gears 130 and 142 can be factory pre-aligned, and no on-site alignment is required. The coupling 100 will take up any misalignment which may occur in the flanges or the like.

Replacement of the central transfer unit 40 requires removal of the walking beam; however, since this unit is also in the form of a factory assembled module, precise alignment is not required in installing a new or rebuilt unit.

I claim:

1. In a vehicle having a frame, a differential unit attached to said frame;
   a pair of walking beams attached to said frame for rotation about an axis transverse to the longitudinal vehicle axis, each of said walking beams having a central aperture and end apertures spaced apart from said central aperture at opposite ends of said walking beam; a central power transfer unit received in said central aperture, said central power transfer unit comprising a housing fastened to said walking beam, a first input shaft supported for rotation in said housing and operatively connected to the output of said differential, a first input gear mounted on said first input shaft for rotation therewith, a pair of generally opposed first output shafts supported in said housing, and a pair of first output gears mounted on said first output shafts for rotation therewith and in meshing engagement with said first input gear; a pair of wheel end power transfer units received in said end apertures, each of said wheel end power transfer units comprising a housing fastened to said walking beam, a second input shaft supported for rotation in said housing, a second input gear mounted on said second input shaft for rotation therewith, a second output shaft supported for rotation in said housing and operatively connected to one of said drive wheels, and a second output gear mounted on said second output shaft for rotation therewith and in meshing engagement with said second input gear; trunnion bearing means attached to said central power transfer unit with the axis of said trunnion bearing means coincident with the axis of rotation of the input shaft of said central transfer units; attachment means in bearing engagement with said trunnion bearing means and attached to said vehicle frame to support said walking beam for rotation about said axis of rotation; and coupling means connected each of said pair of first output shafts of said central transfer unit with said second input shafts of said wheel end transfer units, each of said coupling means comprising a first annular member having internal gear teeth formed therein, a second annular member having internal gear teeth formed therein, and a shaft member connecting said first and second annular members, said shaft member having first and second sets of external gear teeth formed thereon for meshing engagement with said internal gear teeth, said gear teeth being cut to permit rocking movement of said shaft member within said annular members.

2. Apparatus as claimed in claim 1, in which said coupling means connecting each of the said pair of first output shafts of said central transfer unit with said second input shafts of said wheel end transfer units comprises a flange member for connection to said second input shaft of said wheel end transfer unit, said second input shaft having a mating flange attached thereto, and means connecting said flanges whereby the driving connection between said coupling means and said second input shaft is across the faces of said flanges.

3. Apparatus as claimed in claim 2 in which said wheel end transfer unit comprises an end cap member fastened to said housing, said end cap member including means for receiving bearings supporting said before input shaft, and further including an annular lip member extending outward beyond said housing; said apparatus further including a sealing flange member attached to the flange of said coupling means and the flange member attached to said second input shaft and including an annular lip portion extending toward said housing and ending closely adjacent said lip portion of said end cap, and a flexible sealing member engageable with the lip member of said end cap and with the flange member attached to said second input shaft.

4. Apparatus as claimed in claim 1, including a cover member substantially totally enclosing said coupling means, said cover member being fixed to said central transfer unit and to said wheel end transfer unit.

5. Apparatus as claimed in claim 4, in which said cover member comprises a pair of semi-cylindrical members clamped together in engagement with said transfer units.

6. In a vehicle having a frame, a differential unit attached to said frame;
   a pair of walking beams attached to said frame for rotation about an axis transverse to the longitudinal vehicle axis, each of said walking beams having a central aperture and end apertures spaced apart from said central aperture at opposite ends of said walking beam; a central power transfer unit received in said central aperture, said central power transfer unit comprising a housing fastened to said walking beam, a first input shaft supported for rotation in said housing and operatively connected to the output of said differential, a first input gear mounted on said first input shaft for rotation therewith, a pair of generally opposed first output shafts supported in said housing and a pair of first output gears mounted on said output shafts for rotation therewith and in meshing engagement with said first input gear; a pair of wheel end power transfer units received in said end apertures, each of said wheel end power transfer units comprising a housing fastened to said walking beam, a second input shaft supported for rotation in said housing, a second input gear mounted on said second input shaft for rotation therewith, a second output shaft supported for rotation in said housing and operatively connected to one of said drive wheels, and a second output gear mounted on said second output shaft for rotation therewith and in meshing engagement with said second input gear; coupling means connecting the first output shafts of said central transfer unit with the second input shafts of said wheel end transfer units; trunnion bearing means attached to said central power transfer unit with the axis of said trunnion bearing means coincident with the axis of rotation of the input shaft of said central transfer units; and attachment means in bearing engagement with said trunnion bearing means and attached to said vehicle frame to support said walking beam for rotation about said axis of rotation; said trunnion means comprising an inner trunnion attached to said central transfer unit and extending from said central transfer unit toward the longitudinal centerline of said vehicle, and an outer trunnion attached to said central transfer unit and extending outward from said vehicle, said attachment means comprising a first bearing block surrounding said inner trunnion and including annular bearing means in axial floating engagement with said trunnion, and a second bearing block including an annular bearing in engagement with said outer trunnion, a first thrust washer received on said outer trunnion at the inner end of said annular bearing and engaging a shoulder formed on said outer trunnion and a first shoulder formed on said bearing block, and a second thrust washer received on said outer trunnion at the outer end of said annular bearing and engaging a second shoulder formed on said bearing block, and a cover member attached to said outer trunnion and engageable with said second thrust washer.

7. Apparatus as claimed in claim 6, including first sealing means engageable with said inner trunnion and said first bearing block, second sealing means engageable with said outer trunnion and with said second bearing block, and third sealing means in engagement with said second bearing block and with said cover member.

8. In a vehicle having a frame, a differential unit attached to said frame;

a pair of solid walking beams attached to said frame for rotation about an axis transverse to the longitudinal vehicle axis, each of said walking beams having a central aperture and end apertures spaced apart from said central aperture at opposite ends of said walking beam; a central power transfer unit received in said central aperture, said central power transfer unit comprising a housing fastened to said walking beam, a first input shaft supported for rotation in said housing and operatively connected to the output of said differential, a first input gear mounted on said first input shaft for rotation therewith, a pair of generally opposed first output shafts supported in said housing, and a pair of first output gears mounted on said first output shafts for rotation therewith and in meshing engagement with said first input gear; a pair of wheel end power transfer units received in said end apertures, each of said wheel end power transfer units comprising a housing fastened to said walking beam, a second input shaft supported for rotation in said housing, a second input gear mounted on said second input shaft for rotation therewith, a second output shaft supported for rotation in said housing and operatively connected to one of said drive wheels, and a second output gear mounted on said second output shaft for rotation therewith and in meshing engagement with said second input gear; trunnion bearing means attached to said central power transfer unit with the axis of said trunnion bearing means coincident with the axis of rotation of the input shaft of said central transfer units; attachment means in bearing engagement with said trunnion bearing means and attached to said vehicle frame to support said walking beam for rotation about said axis of rotation; flexible coupling means connecting said first output shafts with said second input shafts, said flexible coupling means permitting axial misalignment of said first output shafts and second input shafts due to deflection of said walking beam under load without affecting the meshing engagement of said input and output gears; and a cover member substantially totally enclosing said coupling means, said cover member being fixed to said central transfer unit and to said wheel end transfer unit.

9. Apparatus as claimed in claim 8, in which said cover member comprises a pair of semi-cylindrical members clamped together in engagement with said transfer units.

* * * * *